United States Patent [19]
Back et al.

[11] 3,869,440
[45] Mar. 4, 1975

[54] METAL-COMPLEX AZO DYESTUFFS CONTAINING A 5-SUBSTITUTED-2,3-DIHYDROXYPYRIDINE AS COUPLING COMPONENT

[75] Inventors: Gerhard Back, Loerrach, Germany; Alfred Fasciati, Bottmingen, Switzerland

[73] Assignee: Ciba-Geigy AG, Basel, Switzerland

[22] Filed: Jan. 11, 1972

[21] Appl. No.: 217,041

[30] Foreign Application Priority Data
Jan. 14, 1971  Switzerland............................ 550/71

[52] U.S. Cl.................. 260/146 R, 8/42 R, 8/42 B, 8/43, 260/145 B, 260/146 D, 260/146 T, 260/153, 260/154, 260/155, 260/156
[51] Int. Cl.. C09b 45/14, C09b 45/18, C09b 45/20
[58] Field of Search......................... 260/156, 146 R

[56]  References Cited
UNITED STATES PATENTS

| | | | |
|---|---|---|---|
| 2,519,470 | 8/1950 | Hoffman......................... | 260/156 X |
| 2,857,372 | 10/1958 | Straley et al.................... | 260/146 R |
| 3,419,570 | 12/1968 | Petersen et al. ................ | 260/156 X |
| 3,663,556 | 5/1972 | Petersen et al. ................ | 260/156 X |

FOREIGN PATENTS OR APPLICATIONS

| | | | |
|---|---|---|---|
| 217,079 | 1/1942 | Switzerland......................... | 260/156 |
| 951,524 | 10/1956 | Germany.......................... | 260/146 R |
| 2,019,491 | 6/1972 | France............................ | 260/146 R |
| 6,918,341 | 8/1972 | Netherlands........................ | 260/156 |

*Primary Examiner*—Floyd D. Higel
*Attorney, Agent, or Firm*—Joseph G. Kolodny; Edward McC. Roberts; Prabodh I. Almaula

[57] ABSTRACT

Heavy metal complexes of azo compounds of the formula

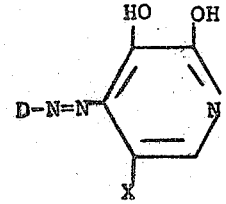

where
D is the residue of a heterocyclic diazo component and is selected from pyridyl; benzthiazolyl that is unsubstituted or substituted by chloro, nitro or methoxy; indazolyl that is unsubstituted or substituted by chloro, methoxy or nitro; triazolyl; carboxytriazolyl; 4-phenyl-5-methyl-pyrazolyl; 1-phenyl-2,3-dimethylpyrazolyl-5-one; benztriazolyl; benzimidazolyl; thiazolyl; methylthiazolyl; thiadiazolyl that is unsubstituted or substituted by phenyl, pyridyl, acetylamino, phenylsulphonyl, chloro, carbomethoxy, methylthio, ethylthio, phenylthio, cyclohexylthio, methylsulphonyl or methyl; quinolyl that is unsubstituted or substituted by sulfo, chloro, bromo, acetylamino, methyl, sulfophenylazo, or sulfophenylazo containing a fibre-reactive acylamino group, where acyl is selected from chloroacetyl, bromoacetyl, β-chloropropionyl, β-bromopropionyl, α,β-dichloropropionyl, α,β-dibromopropionyl, chloromaleyl, acrylyl, β-chloroacrylyl, β-bromoacrylyl, α-chloroacrylyl, α-bromoacrylyl, α,β-dichloroacrylyl, α,β-dibromoacrylyl, trichloroacrylyl, chlorocrotonyl and propiolyl; or benzisothiazolyl that is unsubstituted or substituted by methyl, ethyl, methoxy, chloro, bromo, cyano, nitro, N-methylsulfonamido, N,N-dimethylsulfonamido or methylsulfonyl; or D is phenyl or naphthyl that contains an OH, NH₂ or COOH group in the position orthho-to the azo bond, said phenyl or naphthyl being further unsubstituted or substituted by chloro, bromo, nitro, cyano, lower alkyl, lower alkoxy, lower alkylsulphonyl, sulfonic acid, carboxylic acid, sulphonamide, N-lower alkyl-sulphonamide, N-lower hydroxyalkyl-sulphonamide, N,N-diethylsulphonamide, N,N-di(β-hydroxyethyl)-sulphonamide, phenylazo, naphthylazo, formylamino, acetylamino, benzoylamino, benzenesulphonamide, p-toluenesulphonylamino, methanesulphonylamino, carboxymethoxyamino, carboethoxyamino, dimethylaminosulphonylamino or isopropoxyamino, X is hydroxy, alkoxy of 1 to 4 carbon atoms, phenoxy, naphthoxy, β-hydroxyethylamino, γ-methoxy-n-propylamino, isopropoxy-n-propylamino, N,N-diethylethylenediamine, cyclohexylamino, piperidyl, morpholyl, phenylamino, carboxyphenylamino, sulfonaphthylaminno, mercapto, methylthio, β-hydroxyethylthio, phenylthio, carboxyphenylthio, naphthylthio, thiazolylthio, methylsulphonyl, phenylsulphonyl, methyl-phenylsulphonyl, sulfo or fibre-reactive acrylaminno where acyl is selected from the group consisting of chloroacetyl, bromoacetyl, β-chloropropionyl, β-bromopropionyl, α,β-dichloropropionyl, α,β-dibromopropionyl, chloromaleyl, acrylyl,β-chloroacrylyl, β-bromoacrylyl, α-chloroacrylyl, α-bromoacrylyl, α,β-dichloroacrylyl, α,β-dibromoacrylyl, trichloroacrylyl, chlorocrotonyl and propiolyl are useful to dye such fibers as wool and nylon in shades of green and blue that are fast to acid, alkali, light and rubbing.

9 Claims, No Drawings

METAL-COMPLEX AZO DYESTUFFS CONTAINING A 5-SUBSTITUTED-2,3-DIHYDROXYPYRIDINE AS COUPLING COMPONENT

The invention relates to azo dyestuffs which contain as radical of the coupling component the radical of a dihydroxypyridine, to which additionally a substituent is bonded in the o-position to the azo bridge, which substituent contains at least one heteroatom and may not be a halogen atom. The invention relates in particular to azo dyestuffs which correspond to the formula

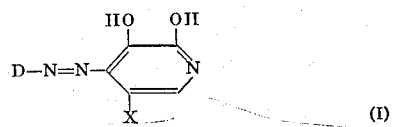

wherein D represents the radical of a diazo component and X represents a substituent which contains at least one heteroatom and is bonded to the dihydroxypyridine radical by at least one heteroatom, and to which the restriction cited hereinabove applies.

The substituent X may be a hydroxy or alkoxy group, an $H_2N$ or amino group such, for example, as a methyl or phenylamino group or a group derived from a cyclic amine, for example piperidine, an aryloxy group, for example a phenoxy or napthoxy group, the mercapto group or an alkyl or arylmercapto group such, for example, as the methyl or phenylmercapto gropou, a sulphonyl group, for example the methyl or phenylsulphonyl group, and, above all, a water-solubilising group, in particular the sulphonic acid group. Also possible as the substituent X are aminoalkylamino or aminoarylamino groups, for example the aminomethyl group or an amino-sulpho-phenyl-amino group, since in the case of these it is possible to introduce a reactive radical into the coupling component by acylation of the amino group by means of a fibre reactive acylating agent.

Important dyestuffs are also those that contain more than once a 5-substituted 2,3-dihydroxy-pyridyl-(4) radical of the above cited definition, for example dyestuffs of the formula

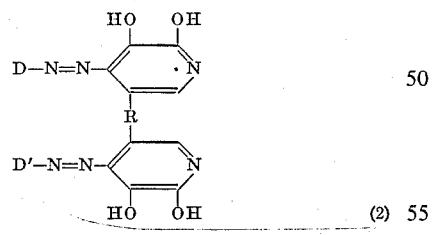

wherein D and D' each represent the radical of a diazo component and R is the radical of a diamine, D and D' are preferably the same.

Importance also attaches to the amine salts of dyestuffs of the kind according to the invention which contain water-solubilising groups, in particular sulphonic acid groups. Suitable amines which may be used for salt formation are primarily higher molecular weight and especially quaternised amines. By forming salts with such amines the dyestuffs become insoluble in water, but instead are soluble in alcohol or acetone and are therefore suitable for spin dyeing, for example of cellulose esters.

Also possible in the formation of cationic dyestuffs by quaternising dyestuffs of the formula (1) which contain in the 5-position the radical of an N,N-dialkylated alkylenediamine, for example N,N-dimethylpropylenediamine.

Finally, as substituent there may be also considered hydroxy, amino, thiole groups and the like, which are contained in fibre materials, such as cellulose or fibres polyamides.

Compounds of particular interest are the heavy metal complexes of the azo compounds of the formula (1), wherein, for example, iron, manganese, nickel, copper and especially cobalt and chromium can be used as complex-forming metals. The heavy metal complexes can contain one or two molecules of azo compounds of the formula (2) bonded to one metal atom (1:1-complexes and 1:2-complexes, respectively). In 1:2-complexes it is however also possible for one of the two ligand molecules to be an azo compound which does not contain the radical of a halogeno-2,3-dihydroxy-pyridine as the coupling component, that is to say, for example, a compound of the azobenzene type, which contains appropriate complex-forming groups.

Thus, there are included the heavy metal complex of azo compounds of the formula

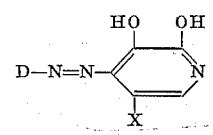

where

D is the residue of a heterocyclic diazo component and is selected from pyridyl; benthiazolyl that is unsubstituted or substituted by chloro, nitro or methoxy; indazolyl that is unsubstituted or substituted by chloro, methoxy or nitro; triazolyl; carboxytriazolyl; 4-phenyl-5-methylpyrazolyl; 1-phenyl-2,3-dimethylpyrazolyl-5-one; benztriazolyl; benzimidazolyl; thiazolyl; methylthiazolyl; thiadiazolyl that is unsubstituted or substituted by phenyl, pyridyl, acetylamino, phenylsulphonyl, chloro, carbomethoxy, methylthio, ethylthio, phenylthio, cyclohexylthio, methylsulphonyl or methyl; quinolyl that is unsubstituted or substituted by sulfo, chloro, bromo, acetylamino, methyl, sulfophenylazo, or sulfophenylazo containing a fibre-reactive acylamino group where acyl is selected from chloroacetyl, bromoacetyl, β-chloropropionyl, β-bromopropionyl, α, β-dichloropropionyl, α, β-dibromopropionyl, chloromaleyl, acrylyl, β-chloroacrylyl, β-bromoacrylyl, α-chloroacrylyl, β-bromoacrylyl, α, β-dichloroacrylyl, α, β-dibromoacrylyl, trichloroacrylyl, chlorocrotonyl and propiolyl; or benzisothiozolyl that is unsubstituted or substituted by methyl, ethyl, methoxy, chloro, bromo, cyano, nitro, N-methylsulphonamido, N,N-dimethylsulfonamido or methylsulfonyl; or D is phenyl or naphthyl that contains an OH, $NH_2$ or COOH group in the position ortho-to the azo bond, said phenyl or naphthyl being further unsubstituted or substituted by chloro, bromo, nitro, cyano, lower alkyl, lower alkoxy, lower alkylsulphonyl, sulfonic acid, carboxylic acid, sulphonamide, N-lower alkylsulphonamide, N-lower hydroxyalkylsulphonamide, N,N-diethylsulphonamide, N,N-di(β-hydroxyethyl)-sulphonamide, phenylazo, naphthylazo, formylamino, acetylamino, benzoylamino, benzenesulphonamide, -toluenesulphonylamino, methanesulphonylamino, carboxymethoxyamino, carboethoxyamino, dimethylamino-sulphonylamino or isopropoxyamino, and X is hydroxy, alkoxy of 1 to 4 carbon atoms, phenoxy, naphthoxy, benzyloxy, amino, alkylamino of 1 to 4 carbon atoms, β-hydroxyethylamino, γ-methoxy-n-propylamino, isopropoxy-n-propylamino, N,N-diethylethylenediamine, cyclohexylamino, piperidyl, morpholyl, phenylamino, carboxyphenylamino, sulfonaphthylamino, mercapto, methylthio, β-hydroxyethylthio, phenylthio, carboxyphenylthio, naphthylthio, thiazolylthio, methylsulphonyl, phenylsulphonyl, methylphenylsulphonyl, sulfo or fibre-reactive acylamino where acyl is selected from the group consisting of chloroacetyl, bromoacetyl, β-chloropropionyl, β-bromopropionyl, α, β-dichloropropionyl, α, β-dibromopropionyl, chloromaleyl, acrylyl, β-chloroacrylyl, β-bromoacrylyl, α-chloroacrylyl, α-bromoacrylyl, α, β-dichloroacrylyl, α, β-dibromoacrylyl, trichloroacrylyl, chlorocrotonyl and propiolyl.

The diazo component D represents an aromatic radical which can itself contain an azo group or is derived from a compound of the anthraquinone, nitroaryl, phthalocyanine or stilbene series or the like. In particular, D is a heterocyclic radical. The diazo component D can be substituted in the usual manner by halogen atoms, hydroxyl, amino, alkyl, aryl, alkoxy, aryloxy, acylamino, carboxyl, sulphonic acid or nitro groups and the like. In the case of heavy metal complexes of the compounds according to the invention, the diazo component D must possess a complex-forming substituent, such as, for example, a hydroxyl, amino or carboxyl group, in the ortho-position to the azo bridge.

Amongst the compounds of the formulae (1) or (2) which are not bonded to a heavy metal atom, compounds of interest are both those which do not contain any water-solubilising groups, and, especially, those which are water-soluble, that is to say, for example, which contain sulphonic acid groups or carboxylic acid groups. In particular, the compounds can possess one or more than one fibre-reactive radical, such as, for example, a halogenated propionic acid radical.

In heavy metal complexes of azo compounds of the formulae (1) and (2) it is also possible for one or more water-solubilising groups to be present. There may also be bonded one or more reactive groups which, in the case where the heavy metal complex only possesses compounds of the formulae (1) or (2) as ligands, are in particular contained in the diazo components of the azo compounds which are bonded as a complex.

In 1:2-complexes in which, apart from a molecule of a compound of the formulae (1) or (2), an azo compound which does not possess a halogeno-2,3-dihydroxy-pyridine as the coupling component is bonded as the ligand, a reactive radical can in particular also be present in the diazo component or in the coupling component of the azo compounds in question.

The heterocyclic diazo components are preferably 5-membered or 6-membered heterocyclic radicals. These radicals can, in particular, possess two or more hetero-atoms, above all nitrogen atoms, such as, for example in the imidazole, thiadiazole or triazole radical, or they can contain a fused benzene radical such as, for example, in the quinoline radical. The azo group can be bonded to the heterocyclic structure itself or to the fused radical which is free of hetero-atoms. The diazo radicals can contain further substituents such as, for example, halogen atoms, nitro, alkyl, alkoxy, aryl, phenyl, acylamino, carboxyl or arylazo groups and especially sulphonic acid groups and reactive radicals, above all reactive atoms bonded via amino groups or aliphatic carboxylic acid radicals containing reactive atom group, for example, the α, β-dibromopropionyl or α-bromoacryl radical, bonded via amino groups.

Products of interest are heavy metal complexes of azo components of the formula

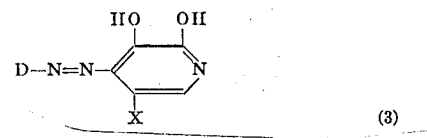

(3)

wherein D is a quinoline radical bonded in the 8-position, and especially heavy metal complexes of azo compounds which correspond to the formula

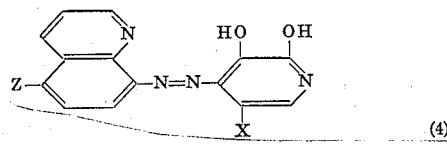

(4)

in which Z represents a halogen atom, for example a chlorine atom, a sulphonic acid group or acylamino group, such as the acetylamino group, or an arylazo group. A possible arylazo group is especially the phenylazo group, which preferably contains a reactive radical, as, for example, in the disazo compound of the formula

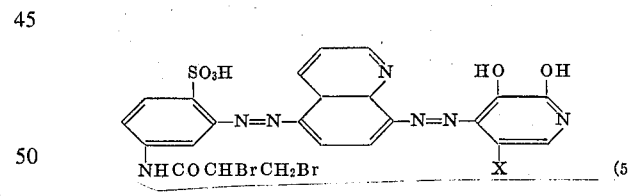

(5)

The diazo radicals which form a structure corresponding to the formulae (3) to (5) do not have to contain any of the customary complex-forming groups, such as, for example, hydroxyl, carboxyl or alkoxy groups, since the metal atom is coordinatively bonded, not only to the HO group, in the ortho-position to the azo group, of the radical of the coupling component, but also to the azo groups and to the nitrogen atom contained in the heterocyclic diazo radical and possessing a lone electron pair. In this way a metal atom for example forms a five-membered and a six-membered ring with a molecule of the formula (4), and correspondingly forms two five-membered and two six-membered rings with two molecules of the formula (4), these being structures which are distinguished by particular stability. The charge of the ion containing the metal atom depends on whether acid groups, especially sulphonic acid groups, or basic groups, such as, for example, quaternised amino groups, are present.

Among the heavy metal complexes according to the invention of the formulae (3) to (5) both those are of interest which do not contain any water-solubilising groups and, above all, those which are water-soluble, that is to say, for example, sulphonic acid or carboxylic acid groups, and contain one or more than one reactive radical.

Suitable reactive radicals are groupings capable of reaction with the hydroxyl groups of cellulose or the amino groups of polyamides to form a covalent chemical bond. Such a groups is, in particular, a low molecular alkanoyl or alkyl-sulphonyl radical substituted by a removable atom or a removable group, a low molecular alkenoyl or alkenesulphonyl radical which is optionally substituted by a removable atom or a removable group, a carbocyclic or heterocyclic radical, containing 4-membered, 5-membered or 6-membered rings, which is bonded via a carbonyl or sulphonyl group and is substituted by a removable atom or a removable group, or a triazine or pyrimidine radical which is directly bonded via a carbon atom and is substituted by a removable atom or a removable group, or contains such a radical. The reactive radical of an aliphatic, saturated or unsaturated alkyl radical which preferably contains halogen atoms and is bonded via a —NH— group, in particular the α, β-dibromopropionyl radical or α-bromoacrylyl radical, is preferred.

The dyestuffs according to the invention are manufactured by reacting azo dyestuffs which contain as radical of the coupling component the radical of the dihydroxypyridine, to which a halogen atom is bonded in the o-position to the azo bridge, with substituting compounds which contain a radical having at least one heteroatom. The reaction takes place preferably in aqueous solution at slightly or only moderately elevated temperature and with a weak acid, neutral, or weak alkaline reaction, especially in the presence of suitable buffer agents.

Suitable starting compounds are in particular azo dyestuffs of the formula

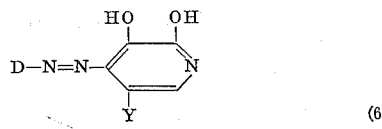

(6)

wherein D represents the radical of a diazo component and Y represents a halogen atom.

As examples of compounds which contain a radical having at least one heteroatom and which are suitable for the manufacture of dyestuffs according to the invention there may be cited: aliphatic or aromatic amines, alcohols, phenols, naphthols, mercaptans such, for example, as thiophenol, alkali s sulphinates, alkali sulphites or alkali sulphides, alkali cyanides, alkali thiocyanates, alkali thiosulphates and the like, by means of which it is possible to introduce the corresponding radicals, for example those cited initially, in the 5-position accompanied by the removal of the halogen atom. Instead of comparatively simple low molecular weight compounds it is also possible to use as reactants dyestuffs which have one, or more than one, corresponding group which contains a heteroatom, for example a free amino group. In this manner several chromagens may be linked with one another and certain shades obtained by the mixture of hues.

As examples of substituting components which contain at least one heteroatom there may be cited: methylamine, ethylamine, n-propylamino, isopropylamine, n-butylamine, cyclohexylamine, piperidine, morpholine, -methoxy-n-propylamine, -isopropoxy-n-propylamine, N,N-diethylethylenediamine, water, methanol, ethanol, propanol, isopropanol, n-butylalcohol, aminoethanol, 4-aminoacetanilide, 2-mercaptoethano, phenol, thiophenol, 2-mercaptothiazole, 2-mercaptonaphthalene, 2-aminobenzoic acid, 2-aminophthalene-6-sulphonic acid, 2-mercaptobenzoic acid, potassium cyanide, α-naphthol, β-napthol, benzylalcohol, sodium p-toluenesulphinate, sodium sulphite, calcium sulphide, etc.

The compounds according to the invention of the formula (1) include those which, as substituent X, contain a radical which is able to react with the amino or thiol groups of nitrogen-containing fibres, for example synthetic polyamides or wool, or with the hydroxy groups of cellulosic materials, for example cotton, and which thus display the property of fibre reactivity. Such radicals X, which are suitable for reacting with the cited functional groups of the polyamide and cellulose fibres, are in particular sulphonic acid groups, alkyl and arylsulphonyl groups, for example the tosyl group, the cyano group, and the 2-mercaptobenzthiazolyl group.

The manufacture of the complex compounds according to the invention is carried out by reacting azo compounds of the type described with metal donors in such a way that metal complexes are produced which per molecule of azo compound contain one or a half atom of a metal bonded as a complex. Accordingly, the metallisation is appropriately carried out with such metal donors and according to such methods as yield, according to experience, complex compounds of this composition.

The manufacture of 1:2-complexes can take place in a single reaction step, by reaction of 1 mol of a compound which donates a heavy metal with 2 mols of an appropriate azo compound, or can take place in stages. In the latter case, a corresponding azo compound, for example an azo compound of the formula (3), is reacted with a metal-donating agent to give a 1:1-complex, and this is subsequently reacted with an equivalent quantity of a corresponding metal-free azo compound to give the 1:2-complex. This procedure is advisable particularly if 1:2-complexes with different ligands are to be manufactured. Such 1:2-complexes in which only one of the two ligands is a compound of the formula (1), can also be converted into the desired 1:2-complex by reaction of an azo compound which does not contain any halogeno-2,3-dihydroxy-pyridine as the coupling component, with a chromium-donating agent and subsequent reaction of the resulting 1:1-complex with a corresponding azo compound of the formula (1).

Instead of reacting a 1:1 chromium complex compound with a suitable second component, as described above, in a molar ratio of 1:1, it is also possible to react the nonmetallised azo compounds used as starting substances, in a molar ratio of 1:1, simultaneously with a metal donor in a solvent mixture, this constituting so-called mixed metallisation.

The reaction with the heavy metal donor takes place according to the customary processes, in various solvents such as, for example, water, ethanol, formamide, glycol ethers, pyridine and others, depending on the solubility of the components, optionally at elevated temperature, in a weakly acid to alkaline medium.

The reaction is advantageously carried out with warming, in an open vessel or under pressure, optionally in the presence of suitable additives, for example, salts of organic acids, of bases or of other agents which promote complex formation.

Particularly valuable complex compounds are obtained if copper (II) salts, nickel (II) salts, or cobalt (II) salts are used as metal donors.

As copper donors it is for example possible to use salts which contain copper as a cation, for example, copper sulphate or copper acetate. In some cases the use of complex copper compounds is of advantage, for example in the form of copper-amine complexes, such as copper tetrammine sulphates from copper sulphate and ammonia, pyridine or monoethanolamine, or in the form of compounds which contain the copper bonded as a complex, for example complex copper compounds of the alkali salts of aliphatic aminocarboxylic acids, hydroxycarboxylic acids or dicarboxylic acids, such as of glycine, of glycollic acid, of lactic acid, of oxalic acid and above all of tartaric acid, such as sodium copper tartrate, of aliphatic tricarboxylic acids, such as citric acid, or aromatic hydroxycarboxylic acids, such as, for example, of salicylic acid.

The treatment with a copper donor can take place according to methods which are in themselves known, for example at room temperature if dealing with easily metallisable starting compounds, or by warming to temperatures between 50° and 120° in an open vessel, for example under reflux cooling, or optionally in a closed vessel under pressure, the $p_H$ conditions being determined by the type of metallisation process chosen; for example, copper is introduced under acid conditions with copper sulphate, and under alkaline conditions with copper tetrammine sulphate. If desired, solvents, such as, for example, alcohol, dimethylformamide and the like can also be added during the metallisation.

The above also applies to the treatment with nickel or cobalt donors.

When converting to the metal complexes, a unitary azo compound is preferentially employed as the starting substance.

The manufacture of the azo compounds of the formula or of the heavy metal complexes in question is effected by coupling a diazotised amine of the formula D—NH$_2$ with a halogeno-2,3-dihydroxy-pyridine, optionally followed by reaction of the azo compound with an agent which donates a heavy metal.

The diazotisation of the amine takes place according to methods which are in themselves known, for example with the aid of hydrochloric acid and sodium nitrite. The coupling with the halogeno-2,3-dihydroxy-pyridine also takes place according to methods which are in themselves known, in an acid to alkaline medium.

After completion of the coupling reaction, the compounds can, for metallisation purposes, be isolated from the coupling mixture by filtration. They are conveniently used as a filter cake without intermediate drying. In many cases it is also possible to carry out the treatment with the metal donors directly in the coupling mixture, without intermediate separation.

The treatment with the chromium or cobalt donors takes place, according to the present process, in such a way that a chromium-containing or cobalt-containing compound is formed, optionally accompanied by the removal of an alkyl radical of an alkoxy group possibly present in the o-position relative to the azo group; this compound contains one or half an atom of chromium or half an atom of cobalt, bonded as a complex, per molecule of azo compound. Accordingly, the metallisation is appropriately carried out with those chromium or cobalt donors, and according to those methods which, according to experience, yield complex compounds of this composition. It is generally advisable to use one, or less than one, atom of chromium or cobalt per molecule of an azo dyestuff, and/or to carry out the metallisation in a weakly acid to akaline agent, if appropriate in the presence of organic solvents. Accordingly, those metal compounds which are stable in an alkaline medium are also particularly suitable for carrying out the process, examples being complex chromium compounds or cobalt compounds of aliphatic dicarboxylic acids or hydroxycarboxylic acids, such as, for example, of oxalic acid, of lactic acid, of citric acid and especially of tartaric acid, or complex chromium compounds of aromatic hydroxycarboxylic acids such as, for example, of salicylic acid. Simple compounds of divalent cobalt, such as cobalt sulphate or cobalt acetate, or optionally freshly precipitaed cobalt hydroxide can also, and in particular with advantage, be used as cobalt donors according to the present process.

The conversion of the azo compounds of the formula (1) into the complex metal compounds is advantageously carried out with warming, in an open vessel or under pressure, optionally in the presence of suitable additives, for example in the presence of salts of organic acids, of bases, of organic solvents or of further agents which promote complex formation and/or promote the splitting off of the alkyl radical of the alkoxy group which may be present in the o-position to the azo group.

Instead of starting from o,o'-dihydroxyazo compounds, it is also possible to use the corresponding o-alkoxy-o'-hydroxyazo compounds; in this case, the alkyl group of the o-alkoxy radical is split off during the metallisation and the same metal complexes as from the dihydroxyazo compounds are obtained.

A particular embodiment of the present process is characterised by starting from mixtures of different metallisable azo compounds which correspond to the initially mentioned general definition, or of which at least one corresponds to this definition. The treatment with the chromium-donating or cobalt-donating agents is here again carried out in such a way that chromium-containing or cobalt-containing complexes are produced which per molecule of azo compound contain one or half an atom of chromium or half an atom of cobalt bonded as a complex.

Valuable compounds are the cobalt compounds and chromium compounds of this kind which contain two o,o'-dihydroxymonoazo compounds corresponding to the general formula (1), both of which have the same composition.

The diazo components can be substituted further, for example by chlorine or bromine atoms, nitro, cyano, lower alkyl, preferably methyl, lower alkoxy, preferably methoxy, lower alkylsulphonyl, such as methylsulphonyl and ethylsulphonyl, sulphonic acid, carboxylic acid, sulphonamide and substituted sulphonamide, for example N-lower alkyl-sulphonamide and N-lower hydroxyalkylsulphonamide, for example N-methylsulphonamide, N,N-diethylsulphonamide, N-($\beta$-hydroxyethyl)-sulphonamide and N,N-di-($\beta$-hydroxyethyl)-sulphonamide, substituted or unsubstituted phenylazo or naphthylazo, acylamino, such as formylamino, acetylamino or benzoylamino, benzenesulphonamide, p-toluenesulphonylamino, methanesulphonylamino, carboxymethoxyamino, carboethoxyamino, dimethylaminosulphonylamino and carboisopropoxyamino groups, as well as by reactive groups.

As diazo components which can be used for the manufacture of the compounds of the formula (1) according to the invention, or of the corresponding heavy metal complexes, the diazo compounds of the following amines may be mentioned: aminobenzene, 1-amino-4-chlorobenzene, 1-amino-4-bromobenzene, 1-amino-4-methylbenzene, 1-amino-4-nitrobenzene, 1-amino-4-cyanobenzene, 1-amino-2,5-dicyanobenzene, 1-amino-4-methylsulphonylbenzene, 1-amino-4-carbalkoxybenzene, 1-amino-2,4-dichlorobenzene, 1-amino-2,4-dibromobenzene, 1-amino-2-methyl-4-chlorobenzene, 1-amino-2-trifluoromethyl-4-chlorobenzene, 1-amino-2-cyano-4-chlorobenzene, 1-amino-2-carbomethoxy-4-chlorobenzene, 1-amino-2-carbomethoxy-4-nitrobenzene, 1-amino-2-chloro-4-cyanobenzene, 1-amino-2-chloro-4-nitrobenzene, 1-amino-2-bromo-4-nitrobenzene, 1-amino-2-chloro-4-carboethoxybenzene, 1-amino-2-chloro-4-methylsulphonylbenzene, 1-amino-2-methylsulphonyl-4-chlorobenzene, 1-amino-2,4-dinitro-6-methylsulphonylbenzene, 1-amino-2,4-dinitro-6-(2'-hydroxyethylsulphonyl)-benzene, 1-amino-2,4-dinitro-6-(2'-chloroethylsulphonyl)-benzene, 1-amino-2-methylsulphonyl-4-nitrobenzene, 1-amino-4-methylsulphonyl-2-nitrobenzene, 1-amino-2,4-dinitrobenzene, 1-amino-2,4-dicyanobenzene, 1-amino-2-cyano-4-methylsulphonylbenzene, 1-amino-2,6-dichloro-4-cyanobenzene, 1-amino-2,6-dichloro-4-nitrobenzene, 1-amino-2,4-dicyano-6-chlorobenzene, 4-aminobenzoic acid cyclohexyl ester, 1-amino-2,4-dinitro-6-chlorobenzene and especially 1-amino-2-cyano-4-nitrobenzene, 1-aminobenzene-2-, -3- or -4-sulphonic acid amides, such as the N-methylamide or N,N-dimethylamide or N,N-diethylamide, 2-aminonaphthalene-6-sulphonic acid N,$\gamma$-isopropoxypropylamide, 1-aminobenzene-2-, -3- or -4-sulphonic acid N,$\gamma$-isopropoxypropylamide, 1-aminobenzene-2-, -3- or -4-sulphonic acid N-isopropylamide, 1-aminobenzene-2-, -3- or -4-sulphonic acid N,$\gamma$-methoxypropylamide, 1-aminobenzene-2-, -3- or -4-sulphonic acid, N,N-bis-($\beta$-hydroxy-ethyl)-amide, 1-amino-4-chlorobenzene-2-sulphonic acid amide and the N substituted derivatives, 4-aminoazobenzene, 3,2'-dimethyl-4-aminoazobenzene, 2-methyl-5-methoxy-4-aminoazobenzene, 4-amino-2-nitroazobenzene, 2,5-dimethoxy-4-aminoazobenzene, 4'-methoxy-4-aminoazobenzene, 2-methyl-4'-methoxy-4-aminoazobenzene, 3,6,4'-trimethoxy-4-aminoazobenzene, 4'-chloro-4-aminoazobenzene, 2'- or 3'-chloro-4-aminoazobenzene, 3-nitro-4-amino-2', 4'-dichloroazobenzene, 4-aminoazobenzene-4'-sulphonic acid amide, 1- or 2-aminonaphthalene, 4-methoxy-5-chloro-2-aminophenol, 6-acetylamino-4-chloro-2-aminophenol, 6-nitro-4-chloro-2-aminophenol, 6-nitro-4-methyl-2-aminophenol, 3-amino-4-hydroxy-acetophenone, 6-nitro-4-acetylamino-2-aminophenol, 5-nitro-3-amino-4-hydroxyacetophenone, 2-aminophenol-4-carboxylic acid amide, 4,6-dichloro-2-aminophenol, 3,4,6-trichloro-2-aminophenol, 4-nitro-6-chloro-2-aminophenol, 6-nitro- or 6-chloro-2-aminophenol-4-sulphonic acid amide, 4-nitro-2-aminophenol-5- or -6-sulphonic acid amide, 2-aminophenol-5-methylsulphone, 2-aminophenol, 4- or 5-nitro-2-aminophenol, 4- or 5-chloro-2-aminophenol, 4,5-dichloro-2-aminophenol, 4-chloro-5-nitro-2-aminophenol, 2-aminophenol-4- or -5-sulphonic acid, 3,4,6-trichloroaminophenol, 4-chloro-2-aminophenol-6-sulphonic acid, 6-chloro-2-aminophenol-4-sulphonic acid, 4-nitro-2-aminophenol-6-sulphonic acid, 6-nitro-2-aminophenol-4-sulphonic acid, 2-aminophenol-4,6-disulphonic acid, 4,6-dinitro-2-aminophenol, 6-acetylamino-2-aminophenol-4-sulphonic acid, 4-acetylamino-2-aminophenol-6-sulphonic acid, 4-methyl-2-aminophenol, 4-methoxy-2-aminophenol, 2-aminophenol-4-sulphonamide, 2-aminophenol-4-sulphone-N-$\beta$-hydroxyethylamide, 2-aminophenol-4-sulphone-N-methylamide, 2-aminophenol-5-sulphonamide, 4-chloro-2-aminophenol-5- or -6-sulphonamide, 2-aminophenol-4-sulphone-N,N-dimethylamide, 2-aminophenol-4-methylsulphone, 2-aminophenol-4-ethylsulphone, 6-acetylamino-4-nitro-2-aminophenol, 2-aminophenol-4,$\beta$-hydroxyethylsulphone, anthranilic acid, 2-amino-3-napthoic acid, 4- or 5-chloroanthranilic acid, 4- or 5-nitroanthranilic acid, 4- or 5-acetylaminoanthranilic acid, 4- or 5-sulphoanthranilic acid, anthranilic acid 4-sulphonamide, anthranilic acid 4- or 5,$\beta$-hydroxyethylsulphone, anthranilic acid 4- or 5-ethylsulphone, 4-chloro-2-aminophenol-5-sulphonic acid N-methylamide, 4- or 5-benzoylaminoanthranilic acid, 2-anisidine, 4- or 5-chloro-2-anisidine, 4- or 5-nitro-2-anisidine, 2-anisidine-4- or -5-sulphonic acid, 2-methoxy-5-methylaniline, 2,5-dimethoxyaniline, 2-anisidine-4- or -5-$\beta$-hydroxyethylsulphone, 2-amino-1-naphthol-4,8-disulphonic acid, 1-amino-2-naphthol-4-sulphonic acid, 1-amino-2-naphthol-4-sulphonamide, 6-nitro-1-amino-2-naphthol-4-sulphonic acid, 6-acetylamino-1-amino-2-naphthol-4-sulphonic acid, 4-(2',5'-disulphophenylazo)-2-methoxy-5-methylaniline, 4-(2',5'-disulphophenylazo)-2,5-dimethoxyaniline, 4-(2',5'-disulphophenylazo)-2-methoxy-1-naphthylamino-6-sulphonic acid, 4-(1',5'-disulphonaphth-2'-ylazo)-2,5-dimethoxyanile, 4-(2',3'- or 4'-sulphophenylazo)-2-methoxyaniline, dianisidine, benzidine-3,3'-dicarboxylic acid, 4-(2'-, 3'- or 4'-sulphophenylazo)-2-methoxy-5-methylaniline, 4-(2'-, 3'- or 4'-sulphophenylazo)-2,5-dimethoxyaniline, 4-(2',5'- or 3',5'-disulphophenylazo)-2-methoxyanile, 4-(3',5'-disulphophenylazo)-2-methoxy-5-methylaniline, 4-(3',5'-disulphophenylazo)-2,5-dimethoxyanile, 4-(2'-carboxy-4'- or -5'-sulphophenylazo)-2-methoxyanile, 4-(2'-carboxy-4'- or -5'-sulphophenylazo)-2,5-dimethoxyaniline, 4-(2'-carboxy-4'- or -5'-sulphophenylazo)-2-methoxy-5-methylaniline, 4-(6',8'-disulphonaphth-2'-ylazo)-2-methoxyaniline, 4-(6',8'-disulphonaphth-2'-ylazo)-2-methoxyaniline, 4-(6',8'-disulphonaphth-2'-ylazo)-2-methoxy-5-methoxyaniline, 4-(6',8'-disulphonaphth-2'-ylazo)-

2,5-dimethoxyaniline, 4-phenylazo-2-aminophenol, 2-(N,N-dimethylsulphonylamino)-aniline and 2-(N,N-ditosylamino)-aniline.

The azo compounds already mentioned which do not correspond to the formula (1), and which may be present, in addition to an azo compound of the formula (1), as ligands in 1:2-complexes, can also be derived from the abovementioned diazo components and from the coupling components mentioned below: phenols, such as, for example, p-cresol, 3,4-dimethylphenol, 2,4-dimethylphenol, 2- or 3-acetylamino-4-methylphenol, 4-t-butylphenol, 2-hydroxy-5,6,7,8-tetrahydronaphthalene, 2-hydroxy-3-sulphonic acid-5,6,7,8-tetrahydronaphthalene, 2-carboethoxyamino-4-methylphenol, resorcinol, m-aminophenol, 2,4-dihydroxyacetophenone, 2,4-dihydroxyazobenzene, 2,4-dihydroxyazobenzene-2'- or -4'-sulphonic acid, 2,-4-dihydroxyazobenzene-2',5'-disulphonic acid, 2,4-dihydroxy-4'-nitroazobenzene, 2,2',4-trihydroxyazobenzene-3',5'-disulphonic acid, 2,4-dihydroxy-4'- or -5'-(acetylamino)-azobenzene-2'-sulphonic acid, 4-(2'',4''-dihydroxyphenylazo)-4'-nitrostilbene-2,2'-disulphonic acid; naphthols, such as, for example, 2-naphthol, 1,3- or 1,5-dihydroxynaphthalene, 2-naphthol-6-sulphonic acid, 1,8-dihydroxynaphthalene-3,6-disulphonic acid, 1,3-dihydroxynaphthalene-5-, -6- or -7-sulphonic acid, 1,3-dihydroxynaphthalene-5,7-disulphonic acid, 2-naphthol-6-sulphonamide, 2-naphthol-6-β-hydroxyethylsulphone, 1-amino-7-naphthol, 1-acetylamino-7-naphthol, 1-propionylamino-7-naphthol, 1-carbomethoxyamino-7-naphthol, 1-carboethoxyamino-7-naphthol, 1-carbopropoxy-amino-7-naphthol, 1-dimethylaminosulphonylamino-7-naphthol, 2-amino-5-naphthol-7-sulphonic acid, 2-amino5-naphthol-1,7-disulphonic acid, 1-amino-4-naphthol, 2-amino-6-naphthol, 2-amino-6-naphthol-8-sulphonic acid, 2-acetylamino-5-naphthol-7-sulphonic acid, 2-benzoylamino-5-naphthol-7-sulphonic acid, 2-phenylamino-5-naphthol-7-sulphonic acid, 2-(3'-aminosulphoanilino)-5-naphthol-7-sulphonic acid, 2-amino-8-naphthol-6-sulphonic acid, 2-acetylamino-8-naphthol-6-sulphonic acid, 2-(3'- or 4'-aminobenzoylamino)-5-naphthol-7-sulphonic acid, 2-(3'- or 4'-aminobenzoylamino)-8-naphthol-6-sulphonic acid, 1-(3'- or 4'-aminobenzoylamino)-8-naphthol-3,6-disulphonic acid, 2-(3'- or 4'-aminoanilino)-5-naphthol-7-sulphonic acid, 2-(3'- or 4'aminoanilino)-8-naphthol-6-sulphonic acid, 1-(3'-or 4'-aminoanilino)-8-naphthol-3,6-disulphonic acid, 2-(3'-amino-4'-sulphoanilino)-5-naphthol-7-sulphonic acid, 2-phenylamino-8-naphthol-3,6-disulphonic acid, 2-(4'-amino-3'-sulphoanilino)-5-naphthol-7-sulphonic acid, 2-(4'-amino-3'-sulphoanilino)-8-naphthol-6-sulphonic acid, 1-amino-8-naphthol-3,6-, -2,4- or -4,6-disulphonic acid, 1-amino- 8-naphthol-4-sulphonic acid, 1-phenylamino-8-naphthol-4-sulphonic acid, 1-amino-5-naphthol-7-sulphonic acid, 1-acetylamino-8-naphthol-3,6- or -4,6-disulphonic acid, 1-benzoylamino-8-naphthol-3,6- or -4,6-disulphonic acid, 1-phenylamino-8-naphthol-3,6- or -4,6-disulphonic acid, 1-naphthol-4-sulphonic acid, 1-naphthol-4,6-disulphonic acid, 2-naphthol-6,8-disulphonic acid, 1-naphthol-5-sulphonic acid, 2-naphthol-3,6-disulphonic acid, 2-naphthol-3,6,8-trisulphonic acid, 2-amino-8-naphthol-3,6-disulphonic acid, 6-acetyl-2-naphthol, 4-acetyl-2-naphthol, 4-methoxy-1-naphthol, 4-acetyl-1-naphthol, 1-naphthol-3-, -4- or -5-sulphonamide, 2-naphthol-3-, -4-, -5-, -6-, -7- or -8-sulphonamide, 5,8-dichloro-1-naphthol, 2-methylamino-5-naphthol-7-sulphonic acid, 2-methylamino-8-naphthol-6-sulphonic acid, 1-butylamino-8-naphthol-3,6-disulphonic acid, 1-naphthol-3,6,8-trisulphonic acid, 6-β-hydroxyethylsulphonyl-2-naphthol-3-sulphonic acid, 1-naphthol-3,6- or -3,8-disulphonic acid, 2-(4'-nitrophenylazo)-1-amino-8-naphthol-3,6- or -3,8-disulphonic acid, 2-(4'-nitrophenylazo)-1-amino-8-naphthol-3,6-disulphonic acid, 2-(2'- or 4'-sulphophenylazo)-1-amino-8-naphthol-3,6-disulphonic acid, 1,4-dichloro-8-naphthol, 1-naphthol-8-sulphonic acid, 2-(2',5'-disulphophenylazo)-1-amino-8-naphthol-3,6-disulphonic acid, 2-naphthol-7- or -8-sulphonic acid; heterocyclic coupling components, such as barbituric acid, 2,6-dihydroxy-3-cyano-4-methyl-pyridine; pyridone, such as, for example, 1-methyl-3-cyano-4-ethyl-6-hydroxy-pyridone, 1-amino-3-cyano-4-methyl-6-hydroxy-pyridone, 1-phenyl-3-carbamido-4-methyl-6-hydroxy-pyridone, 2,4-dihydroxyquinoline; 5-pyrazolones, such as 3-methyl-5-pyrazolone, 1,3-dimethyl-5-pyrazolones, 5-pyrazolone-3-carboxylic acid and its amides, preferably 1-aryl-5-pyrazolones, such as 1-phenyl-3-methyl-5-pyrazolone, 1-(2'-, 3'- or 4'-methylphenyl)-3-methyl-5-pyrazolone, 1-(2'-, 3'- or 4'-sulphophenyl)-3-methyl-5-pyrazolone, 1-[3'- or 4'-(βhydroxyethylsulphonyl)-phenyl]-3-methyl-5-pyrazolone, 1-phenyl-3-carboxy-5-pyrazolone, 1-(3'- or 4'-aminophenyl)-3-methyl-5-pyrazolone, 1-(2'-methoxyphenyl)-3-methyl-5-pyrazolone, 1-(2'-, 3'- or 4'-chlorophenyl)-3-methyl-5-pyrazolone, 1-(3'- or 4'-aminophenyl)-3-carboxy-5-pyrazolone, 1-(3'-amino-4'-sulphophenyl)-3-(carboxy- or methyl)-5-pyrazolone, 1-(4'-amino-3'-sulphophenyl)-3-carboxy-. or methyl)-5-pyrazolone, 1-(2'-, 3'- or 4'-nitrophenyl)-3-methyl-5-pyrazolone, 1-(2', 5'or 3',4'- dichlorophenyl)-3-methyl-5-pyrazolone, 1-(2'-, 3'- or 4'-sulphamylphenyl)-3-methyl-5-pyrazolone, 1-(2'-, 3'- or 4'-methylsulphonylphenyl)-3-methyl-5-pyrazolone, 1-phenyl-5-pyrazolone-3-carboxylic acid cresidide, 1-phenyl-5-pyrazolone-3-carboxylic acid 2'-toluidide, 1-phenyl-5-pyrazolone-3-carboxylic acid anilide, 1,3-diphenyl-5-pyrazolone 1-(2'-, 3'- or 4'-N-methylsulphamylphenyl)-3-methyl-5-pyrazolone, 1-(6'-chloro-3'-methyl-4'-sulphophenyl)-3-methyl-5-pyrazolone, 1-(2',5'-dichloro-4'-sulphophenyl)-3-methyl-5-pyrazolone, 1-(2'-methyl-5'-sulphophenyl)-3-methyl-5-pyrazolone, 1-(4'-chloro-2'-sulphophenyl)-3-methyl-5-pyrazolone, 1-(6'-chloro-4'-sulpho-2'-methylphenyl)-3-carboethoxy-5-pyrazolone, 1-(2',5'-disulphophenyl)-3-methyl-5-pyrazolone, 1-(4'-sulphophenyl)-3-carboxy-5-pyrazolone, 1-(2'-, 3'or 4'-carboxyphenyl)-3-methyl-5-pyrazolone, 1-(6'-chloro-4'-sulpho-2'-methylphenyl)-3-methyl-5 -pyrazolone, 3-carbody-5-pyrazolone; acetoacetic acid amides, preferably acetoacetanilides and benzoylacetanilides, such as, for example, acetoacetanilide, acetoacet-4-(β-hydroxyethylsulphonyl)-anilide, acetoacet-o-anisidide, acetoacet-o-toluidide, acetoacet-o-chloroanilide, acetoacetanilide-3- or -4-sulphonic acid, acetoacet-3- or -4-aminoanilide, acetoacet-m-xylidide, acetoacetanilide-2-, -3- or -4-carboxylic acid, benzoylacetanilide, benzoylacetanilide-3- or -4-sulphonic acid, benzoylacet-3- or -4-aminoanilide, acetoacetanilide-4-sulphonamide; naphthylamines, such as, for example, 2-naphthylamine, 1-naphthylamine, 1-naphthylamine-4-sulphonic acid, 2-methylaminonaphthalene, 2-aminonaphthalene-6-sulphonamide, 2-amino-8-naphthol-6-sulphonic acid, 2-methylamino-8-naphthol-6-sulphonic acid, 2-phenylamino-8-naphthol-6-sulphonic acid, 2-phenylaminonaphthalene, 2-(3'-chlorophenyl)-aminonaphthalene, 2-(2'-carboxyphenyl)-aminonaphthalene, 2-aminonaphthalene-6-sulphonic acid, and 2-aminonaphthalene-6-sulphonic acid N-methylamide.

As examples of primary heterocyclic amines which can be used for the manufacture of the azo compounds there may be mentioned: 2-aminopyridine, 2-aminoquinoline, 2-aminobenzthiazole, 2-amino-6-methoxy-benzthiazole, 2-amino-6-nitro-benzthiazole, 3-amino-indazole, 3-amino-6-chloroindazole, 3-amino-6-methoxy-indazole, 7-amino-indazole, 7-amino-4-nitro-indazole, 5-aminotriazole-3-carboxylic acid, 3-amino-4-phenyl-5-methylpyrazole, 4-amino-benztriazole, 7-amino-5-chloro-benzimidazole, 4-amino-5-chloro-benzthiazole, 2-aminothiazole, 2-amino-4-methyl-thiazole, 3-amino-1,2,4-triazole, 5-amino-1,2,4-triazole, 1-phenyl-2,3-dimethyl-4-amino-pyrazol-5-one, 5-amino-2-phenyl-1,3,4-thiadiazole, 5-amino-3-phenyl-1,2,4-thiadiazole, 8-aminoquinoline, 8-aminoquinoline-5-sulphonic acid, 5-chloro-8-aminoquinoline, 5-acetylamino-8-aminoquinoline, 2-methyl-8-aminoquinoline, 4-aminoacridine, 1-aminocarbazole, 2-amino-5-nitro-thiazole, 5-amino-3-pyridyl-1,2,4-thiadiazole, 4-amino-3-methylpyrazolone(5), 5,7-dibromo-8-amino-quinoline, 8-amino-5-(4'-sulphophenylazo)-quinoline, 5-(2'-sulpho-5'-$\alpha$,$\beta$-dibromopropionylamino-1'-phenylazo)-8-aminoquinoline, 2-amino-5-methylthio-1,3,4-thiadiazole, 2-amino-5-ethylthio-1,3,4-thiadiazole, 2-amino-5-phenylthio-1,3,4-thiadiazole, 2-amino-5-cyclohexylthio-1,3,4-thiadiazole, 2-amino-5-methylsulphonyl-1,3,4-thiadiazole, 2-amino-5-methyl-1,3,4-thiadiazole, 2-amino-5-acetylamino-1,3,4-thiadiazole, 2-amino-5-phenyl-sulphonyl-1,3,4-thiadiazole, 2-amino-5-chloro-1,3,4-thiadiazole, 2-amino-5-carbomethoxyethyl-1,3,4-thiadiazole, 3-amino-2,1-benzisothiazole, 3-amino-5-methyl-2,1-benzisothiazole, 3-amino-4-ethyl-2,1-benzisothiazole, 3-amino-4,7-dimethyl-2,1-benzisothiazole, 3-amino-4-methoxy-2,1-benzisothiazole, 3-amino-5-, -6- or -7-chloro-2,1-benzisothiazole, 3-amino-5,7-dichloro or -dibromo-2,1-benzisothiazole, 3-amino-4-, -5-, -6- or -7-bromo-2,1-benzisothiazole, 3-amino-5- or -6-cyano-2,1-benzisothiazole, 3-amino-4,6-dichloro-5-cyano-2,1-benzisothiazole, 3-amino-7-chloro-5-cyano-2,1-benziso-thiazole, 3-amino-5-chloro-7-cyano-2,1-2,1-benzisothiazole, 3-amino-4-methyl-6-cyano-2,1-benzisothiazole, 3-amino-4-,-5-, -6- or -7-nitro-2,1-benzisothiazole, 3-amino-5,7-dinitro-2,1-benzisothiazole, 3-amino-5-nitro-7-chloro-2,1-benzisothiazole, 3-amino-5-nitro-7-bromo-2,1-benzisothiazole, 3-amino-5-(N-methyl-sulphonamido)-2,1-benzisothiazole, 3-amino-5-(N,N-dimethylsulphonamido)-2,1-benzisothiozole and 3-amino-5-methylsulphonyl-2,1-benzisothiazole.

Compounds of the formula (1) or the corresponding heavy metal complexes which contain one or more reactive groups can be manufactured by using diazo components or coupling components which already contain reactive groups. In many cases it is, however, also possible to introduce reactive groups subsequently into the azo compounds. The introduction can take place after coupling or after metallisation. Compounds of particular interest are those which contain a 6-membered heterocyclic radical bonded via an amino group or an aliphatic reactive radical containing not more than three carbon atoms.

The introduction of the reactive radical is preferably effected by acylation of appropriate azo compounds which contain an acylatable amino group, or of appropriate diazo components which in addition to the amino group to be diazotised also contain a further acylatable amino group, or a group such, for example, as the nitro group or the acetylamino group, which can be converted, for example by reduction of saponification, into an acylatable amino group.

As such compounds, there should especially be mentioned heterocyclic diazo components which contain an aminoarylazo group, such as, for example, 5-(3'-amino-4'-sulphophenylazo)-8-amino-quinoline, 5-(4'-amino-2'-sulphophenylazo)-8-amino-quinoline or 5-(4'-amino-2',5-disulphophenylazo)-8-amino-quinoline, which can be converted into reactive diazo components by acylation of the amino group bonded to the phenyl radical.

An additional starting compounds (diazo components or coupling components) which, as described above, are suitable for the introduction of a reactive radical, there may, for example, be mentioned:

Diazo components: 1,3-diaminobenzene-4-sulphonic acid, 1,4-diaminobenzene-2-sulphonic acid, 1,4-diaminobenzene-2,5- or -2,6-disulphonic acid, 1-amino-4-nitrobenzene, 1-amino-2-chloro-4-nitrobenzene, 6-acetylamino-4-chloro-2-aminophenol, 6-nitro-4-methyl-2-aminophenol, 4-nitro-2-aminophenol-6-sulphonic acid, 6-acetylamino-1-amino-2-naphthol-4-sulphonic acid and other compounds, for example compounds mentioned in the recital of possible diazo commponents.

Coupling components: 2-acetylamino-4-methylphenol, m-aminophenol, 2,4-dihydroxy-4'-nitroazobenzene, 1-amino-7-naphthol, 2-amino-5-naphthol-7-sulphonic acid, 2-acetylamino-5-naphthol-7-sulphonic acid, 1-(3'- or 4'-aminoanilino)-8-naphthol-3,6-disulphonic acid, 1-(4'-amino-3'-sulphophenyl)-3-methyl-5-pyrazolone, 2-naphthylamine and other compounds, for example compounds mentioned in the list of possible coupling.

As azo compounds of the formula (1), or further ligands, not corresponding to the formula (1), in 1:2-heavy metal complexes, into which reactive radicals (that is to say after coupling or after metallisation, see above) can be introduced, it is for example possible to use the coupling products of the abovementioned diazo components or coupling components with appropriate compounds which can be coupled, and these can optionally in turn contain amino groups which can be acylated, so that compounds of the formula (1) or corresponding heavy metal complexes are produced, which contain more than one reactive group in the finished molecule or complex.

As acylating agents which contain a reactive radical in addition to the acylating position, it is in particular possible to use the halides or anhydrides of organic acids which contain easily replaceable atoms or groups of atoms.

As acylating agents which contain a fibre-reactive radical, the following may, for example, be mentioned: chloroacetyl chloride or bromoacetyl chloride, β-chloropropionyl chloride or β-bromopropionylchloride, α,β-dichloropropionyl chloride or α,β-dibromopropionyl chloride, chloromaleic anhydride, carbyl sulphate, acrylyl chloride, β-chloroacrylyl chloride or β-bromoacrylyl chloride, α-chloroacrylyl chloride or α-bromoacrylyl chloride, α,β-dichloroacrylyl chloride or α,β-dibromoacrylyl chloride, trichloroacrylyl chloride, chlorocrotonyl chloride, propiolic acid chloride, 3,5-dinitro-4-chlorobenzene-sulphonic acid chloride or -carboxylic acid chloride, 3-nitro-4-chlorobenzene-sulphonic acid chloride or -carboxylic acid chloride, 2,2,3,3-tetrafluorocyclobutane-1-carboxylic acid chloride, β-chloroethylsulphonylendomethylene-cyclohexanecarboxylic acid chloride, acrylylsulphonyl-endomethylene-cyclohexanecarboxylic acid chloride, and above all heterocyclic acid halides and their derivatives, such as the 2-chlorobenzoxazolecarboxylic acid chlorides, 2-chlorobenzthiazolecarboxylic acid chlorides or -sulphonic acid chlorides and above all the following compounds, which possess at least 2 nitrogen atoms as hetero-atoms of a 6-membered structure: 4,5-dichloro-1-phenylpyridazonecarboxylic acid chloride or -sulphonic acid chloride, 4,5-dichloropyridazonepropionic acid chloride, 1,4-dichlorophthalazinecarboxylic acid chloride or -sulphonic acid chloride, 2,3-dichloroquinoxalinecarboxylic acid chloride or -sulphonic acid chloride, 2,4-dichloroquinazolinecarboxylic acid chloride or -sulphonic acid chloride, 2-methanesulphonyl-4-chloro-6-methylpyrimidine, tetrachloropyridazine, 2,4-bis-methanesulphonyl-6-methylpyrimidine, 2,4,6-tri- or 2,4,5,6-tetrachloropyrimidine, 2,4,6-tri- or 2,4,5,6-tetrabromopyrimidine, 2-methanesulphonyl-4,5-dichloro-6-methylpyrimidine, 2,4-dichloropyrimidine-5-sulphonic acid, 5-nitro- or 5-cyano-2,4,6-trichloropyrimidine, 2,6-bis-methanesulphonylpyridine-4-carboxylic acid chloride, 2,4-dichloro-5-chloromethyl-6-methyl-pyrimidine, 2,4-dibromo-5-bromomethyl-6-methyl-pyrimidine, 2,4-dichloro-5-chloromethylpyrimidine, 2,4-dibromo-5-bromomethylpyrimidine, 2,5,6-trichloro-4-methylpyrimidine, 2,6-dichloro-4-trichloromethyl-pyrimidine or especially 2,4-dimethanesulphonyl-5-chloro-6-methylpyrimidine,2,4,6-trimethanesulphonyl-1,3,5-triazine, 2,4-dichloropyrimidine, 3,6-dichloropyridazine, 3,6-dichloropyridazine-5-carboxylic acid chloride, 2,6-dichloro- or 2,6-dibromo-4-carboethoxypyrimidine, 2,4,5-trichloropyrimidine, 2,4-dichloropyrimidine-6-carboxylic acid chloride, 2,4-dichloropyrimidine-5-carboxylic acid chloride, 2,6-dichloro- or 2,6-dibromopyrimidine-4- or -5-carboxylic acid amide or -sulphonic acid amide or -4- or -5-sulphonic acid chloride, 2,4,5,6-tetrachloropyridazine, 5-bromo-2,4,6-trichloropyrimidine, 5-acetyl-2,4,6-trichloropyrimidine, 5-nitro-6-methyl-2,4-dichloropyrimidine, 2-chlorobenzthiazole-6-carboxylic acid chloride, 2-chlorobenzthiazole-6-sulphonic acid chloride, 5-nitro-6-methyl-2,4-dichloropyrimidine, 2,4,6-trichloro-5-chloropyrimidine, 2,4,5,6-tetrafluoropyrimidine, 4,6-difluoro-5-chloropyrimidine, 2,4,6-trifluoro-5-chloropyrimidine, 2,4,5-trifluoropyrimidine, 2,4,6-trichloro (-tribromo or -trifluoro)-1,3,5-triazines, as well as 4,6-dichloro (-dibromo or -difluoro)-1,3,5-triazines which are substituted in the 2-position by an aryl or alkyl radical, for example a phenyl methyl or ethyl radical, or by the radical of an aliphatic or aromatic mercapto compound bonded via the sulphur atom, or hydroxy compound bonded via the oxygen atom, or especially by a NH$_2$ group or by the radical of an aliphatic, heterocyclic or aromatic amino compound bonded via the nitrogen atom. As such compounds, the radicals of which can be bonded to the triazine nucleus in the 2-position by reaction with trihalogenotriazines, the following may for example be mentioned: aliphatic or aromatic mercapto compounds or hydroxyl compounds, such as thioalcohols, thioglycollic acid, thiophenols, alkoxyalkanols, methyl alcohol, ethyl alcohol, isopropyl alcohol, glycollic acid, phenol, chlorophenols or nitrophenols, phenolcarboxylic and phenolsulphonic acids, naphthols, naphtholsulphonic acids and the like, but especially ammonia and compounds containing amino groups which can be acylated, such as hydroxylamine, hydrazine, phenylhydrazine, phenylhydrazinesulphonic acids, glycol monoalkyl ethers, methylamine, ethylamine, isopropylamine, methoxyethylamine, methoxypropylamine, dimethylamine, diethylamine, methylphenylamine, ethylenephenylamine, chloroethylamine, ethanolamine, propanolamines, benzylamine, cyclohexylamine, morpholine, piperidine, piperazine, aminocarbonic acid esters, aminoacetic acid ethyl ester, aminoethanesulphonic and N-methylaminoethanesulphonic acid, but above all aromatic amimes, such as aniline, N-methylaniline, toluidines, xylidines, chloroanilines, p- and m-aminoacetanilide, aminophenols, anisidine, phenetidine and especially anilines containing acid groups, sulphanilic acid, methanilic acid, orthanilic acid, anilinedisulphonic acid, aminobenzylsulphonic acid, aniline-ω-methanesulphonic acid, aminobenzenedicarboxylic acids, naphthylaminomonosulphonic, -disulphonic and -trisulphonic acids, aminobenzoic acids, such as 2-hydroxy-5-aminobenzoic acid, and also coloured compounds, or compounds possessing dyestuff character, for example 4-nitro-4'-amino-stilbenedisulphonic acid, 2-nitro-4'-amino-diphenylamino-4,3'-stilbene-disulphonic acid, 2-nitro-4'-aminodiphenylamine-4,3'-disulphonic acid and especially aminoazo dyestuffs or aminoanthraquinones or phthalocyanines which still contain at least one reactive amino group.

The introduction of the substituent which is in the 2-position of the triazine radical can also take place after the condensation with the starting diamine or after the reaction, according to the invention, to give the azo compound of the formula (1).

Apart from the fibre-reactive radicals which can be introduced by acylation, further fibre-reactive radicals which may be mentioned are, for example, the vinylsulphone, β-sulphatoethylsulphone or β-thiosulphatoethylsulphone, β-thiosulphatopropionylamide, β-thiosulphatoethylsulphonylamide, or sulphonic acid-N,β-sulphatoethylamide group, which are introduced into the diazo component in a different manner, for example by ester formation or thioester formation.

As compounds which contain a fibre-reactive radical which cannot be introduced by acylation, and in which the fibre-reactive radical is thus preferably not bonded via an amino group but is directly bonded to the benzene radical, the sulpho-esters of the following sulphones may, in particular, be mentioned: 1-amino-2-methoxy-5-(β-hydroxyethyl)-phenylsulphone, 1-aminobenze-3- or -4-β-hydroxyethylsulphone, 1-amino-2-methyl-benzene-5-β-hydroxyethylsulphone, 1-amino-4 -(β-hydroxyethylsulphonylpropionylaminomethyl)-benzene, 1-amino-4-(β-hydroxyethylsulphonylamino)-benzene, and also reactive compounds obtainable via corresponding methylols by Einhorn's method, such as, for example, 1-amino-4-chloroacetylaminomethylbenzene or 1-amino-3-chloroacetylaminomethyl-benzene-6-sulphonic acid.

The condensation with the acid halides or anhydrides or with the heterocyclic halogen compounds as appropriately carried out in the presence of acid-binding agents such as, for example, sodium carbonate or sodium hydroxide, and under such conditions that an unsaturated bond or a replaceable halogen atom still remains in the final product, that is to say, for example, in organic solvents or at relatively low temperatures in aqueous media.

The 1:1 heavy metal complexes, especially the 1:1 cobalt complexes, of the azo compounds according to the invention can be stabilised by addition of several, especially of three, organic radicals which are bonded to the metal atom via nitrogen atoms.

Of the radicals which form a chelate complex with metal via a primary, secondary or tertiary nitrogen atom, at least two, and preferably all three, belong to one and the same, preferably aliphatic, polyamine, and this polyamine contains three, or preferably two, further atoms, between the individual nitrogen atoms, so that the chelate complex or complexes produced are 6-membered, or preferably 5-membered, if the metal atom is included. Examples of such polyamines which may be mentioned are: diaminoalkylenes, wherein the alkylene bridge consists of 3, or preferably 2, carbon atoms, or N-alkyl, N-aminoalkyl or C-aminoalkyl derivitives thereof, for example ethylenediamine, 1,2- or 1,3-diaminopropane, 1,2- or 1,3-diamino-n-butane, β-(methylamino)-ethylamine, β-(ethylamino)-ethylamine, β-(dimethylamino)-ethylamine, N-(β-hydroxyethyl)-ethylenediamine, N,N'-dimethylethylenediamine, N,N',N''-trimethylethylenediamine and N,N',N'',N'''-tetramethylethylenediamine, but especially diethylenetriamines, triethylenetetramines, tetraethylenepentamines, dipropylenetriamines and the like.

If a diamine is used, the third ligand bonded as a complex to the metal atom can be ammonia or a primary, secondary or tertiary amine, for example methylamine, ethylamine, monoethanolamine and diethanolamine, dimethylamine, diethylamine, benzylamine, aniline, triethanolamine, piperidine or pyridine.

Especially in the case of the cobalt complexes, the new compounds are appropriately manufactured by metallising the mixture of the azo compound and of the amine or amines with cobalt-donors, in which case the reaction takes place practically instantaneously. Where an alkoxy group is present in the adjacent position to the azo group, the alkoxy group is converted in the usual manner (temporarily) into a hydroxyl group during the metallisation (so-called dealkylating metallisation). It is also possible first to manufacture the corresponding 1:2 cobalt-amine complexes by reaction of the amines mentioned with cobalt donors, and then to convert the former, by reaction with a metallisable azo compound, into the complexes. The chromium complexes can appropriately be manufactured by first manufacturing the 1:1 chromium complex of the azo compound and then reacting it with the amine or the amines.

In carrying out the first of the manufacturing processes mentioned above, it is generally advisable to use the metallising agent, the azo compound and the amine or the amines approximately in the stoichiometric amounts required in accordance with the composition of the end product. It is furthermore generally advisable to carry out the metallisation in a weakly acid to alkaline medium. Simple cobalt salts, such as cobalt sulphate, or, if appropriate, freshly precipitated cobalt hydroxide, are preferably used as cobalt donors. Using these simple cobalt salts, the treatment according to the invention can also be carried out in a weakly acid medium.

The conversion into the complex cobalt compounds is advantageously carried out with warming, in an open vessel or under pressure, for example at the boiling point of the reaction mixture, and optionally in the presence of suitable additives, for example in the presence of salts of organic acids, or the presence of bases, organic solvents, such as, for example, glycol monomethyl ether, ethanol or n-butanol, or further agents which assist complex formation.

Surprisingly, these amine complexes, which contain neither sulpho groups nor carboxyl groups, in the azo compound, not only show excellent solubility in alcohol, but in part also show good solubility in water.

The metal-containing, especially copper-containing or nickel-containing, azo compounds obtainable according to the present process and its variants are new; they are suitable for dyeing and printing the most diverse substances, but above all for dyeing animal materials, such as silk, leather and especially wool, though they are also suitable for dyeing and printing synthetic fibres of polyamides or polyurethanes, polyacrylonitrile fibres and the like.

If no sulphonic acid groups or similar groups are present, the solubility in water of the metal complex compounds according to the invention is greatly reduced. Instead, far better solubility in organic solvents result. If no substituents which can be solvated, such as, for example, a sulphonamide group or nitro group, are present, the solubility in organic solvents is only moderate.

The complexes having one or more sulphonic acid groups are especially suitable for use as dyestuffs for wool, silk, leather and especially polyamides. The complexes containing sulphonamide groups can be used as dyestuffs and as dyestuffs for the spin dyeing of polyamides. If the complexes which possess a fibre-reactive group contain two or more sulphonic acid groups, they can be employed as reactive dyestuffs in the usual manner; if sulphonic acid groups are entirely absent, the products are reactive dispersion dyestuffs.

The heavy metal complexes according to the invention which contain a cationic charge can especially be used as dyestuffs for polyacrylonitrile fibres.

The new dyestuffs can be used for dyeing nitrogen-containing fibres, such as wool, for example from baths wherein the acidity ranges from that due to acetic acid to neutrality, and if appropriate, that is to say when using dyestuffs of only restricted solubility in water, with the addition of suitable dispersing agents. Especially when using complexes of good solubility in water, that is to say containing two or more sulpho groups in the azo compound, dyeing is appropriately carried out with the addition of the assistants customary in dyeing practice.

Furthermore, nitrogen-containing fibres, especially wool, can be dyed advantageously with the dyestuffs manufactured according to the present process if the fibres are treated, appropriately in a continuous process, for example on a padder, with an aqueous preparation which contains a wool dyestuff and an assistant which, with water and optionally with additives, is capable of forming a system of two liquid phases with a miscibility gap wherein the ratio of the water, optionally containing additives, and the assistant lies within the miscibility gap or near it, the miscibility gap being already present at a relatively low content of assistants, and over a large range of the miscibility gap the phase which contains more assistant accounts for a substantial part, and thereafter the material provided with the aqueous preparation is subjected to a heat treatment.

The dyeings and prints obtainable with the new dyestuffs are as a rule distinguished by uniformity, resistance to acid and alkali, good fastness to light and good fastness to rubbing; as a rule, they hardly change their appearance in artificial light, and in part they show very interesting and valuable shades.

The new dyestuffs yield particularly pure shades when dyeing polyamide fibres, especially when dyeing material of nylon-6,6.

In the example which follows the parts, unless otherwise stated, denote parts by weight, and the percentages denote percentages by weight. The relationship of parts by weight to parts by volume is the same as of the gram to the cm$^3$.

EXAMPLE 1

42.5 Parts of the monoazo dyestuff obtainable by the coupling in alkaline medium of 2,3-dihydroxy-5-bromopyridine with diazotised 8-aminoquinoline-5-sulphonic acid are dissolved with stirring in 800 parts of water at a temperature of 80°–90°C. After dropping in 11 parts of n-butylamine the reaction solution is stirred at 90°–95°C until no more unchanged starting dyestuff can be detected. The shade of the solution changes during this process from reddish violet to orange brown. The new dyestuff of the probable formula

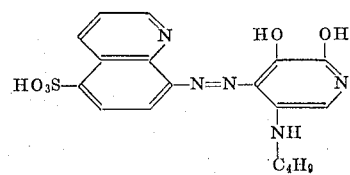

is precipitated by treating the reaction solution with 80 parts of sodium chloride. The precipitated dyestuff is isolated by filtration and washed with dilute saline solution.

The resulting dyestuff paste, together with 15 parts of crystallised sodium acetate, is dissolved in 1,000 parts of water at 70°–75°C with stirring. Upon addition of a solution of 27.5 parts of crystallised copper sulphate in 200 parts of water, the metallising mixture is stirred at 70°–75°C until the metal-free starting dyestuff can no longer be detected. The resulting blue 1:1 copper complex of the dyestuff of the above constitution is precipitated from the solution by adding sodium chloride, filtered, and washed with saline solution. The dyestuff which is obtained after drying and grinding dyes wool and polyamide fibres from a weak acid bath in fast, greyish blue shades.

If the metallising of the dyestuff is carried out wtih 30 parts of nickel heptahydrate or 15 parts of cobalt-II-sulphate-heptahydrate instead of with copper sulphate, the corresponding 1:1 nickel or 1:2 nickel complex is formed with which it is possible to dye wool or polyamide fibres from a weak acid bath in pure, bluish green or green shades.

The dyestuff paste obtained according to the above instruction, b 800 parts by volume of water, 25 parts by volume of a 20 percent sodium carbonate solution, and 130 parts by volume of an aqueous solution of sodium disalicylato-chromiate-III containing 3.07 vol. percent of chromium, are stirred under reflux until the starting dyestuff can no longer be detected. The 1:2 chromium complex of the starting dyestuff, precipitated with potassium chloride and isolated by filtration, dyes wool in greenish grey shades.

EXAMPLE 2

42.5 Parts of the azo dyestuff mentioned in Example 1 and obtained from diazotised 8-aminoquinoline-5-sulphonic acid and 2,3-dihydroxy-5-bromopyridine, are stirred with 1,000 parts of water at room temperature. Upon addition of 20 parts of anhydrous sodium sulphite the reaction mixture is stirred for 12 hours at 30°–35°C. In the process the original suspension turns into a clear solution without any change in the initial reddish violet shade. The starting dyestuff can no longer be detected. The new dyestuff of the probable constitution

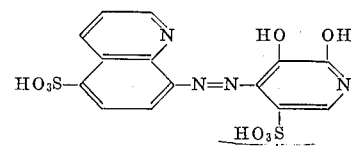

is precipitated from the solution by addition of ammonium sulphate, filtered off, and washed with concentrated ammonium sulphate solution. Metallising with copper sulphate according to the directions of Example 1 yields the corresponding 1:1 copper complex which dyes wool or polyamide fibres from a weak acid bath in pure blue shades.

It is also possible to carry out the reaction with the 1:1 copper complex of the starting dyestuff. The new complex is identical with the dyestuff containing copper which is obtained by subsequent metallising and described above.

EXAMPLE 3

38.0 Parts of the monoazo dyestuff obtainable by the coupling in alkaline medium of 2,3-dihydroxy-5-chloropyridine with diazotised 8-aminoquinoline-5- sulphonic acid are stirred with 1,000 parts of water which has a temperature of 50°C. Upon addition of 10 parts of sodium carbonate and 20 parts of sodium p-toluenesufinate, the reaction mixture is stirred for 24 hours at 50°C. The new dyestuff of the probable constitution

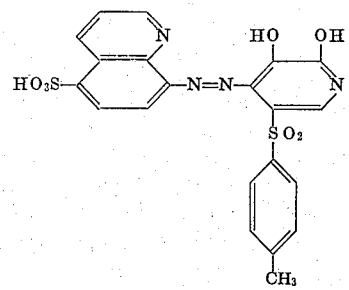

precipitates to a substantial extent from the originally clear solution. The precipitation is brought to completion by addition of potassium chloride, the dyestuff is isolated by filtration and washed with dilute potassium chloride, the dyestuff is isolated by filtration and washed with dilute potassium chloride solution.

If the resulting dyestuff paste is metallised according to the directions of the Example with copper, nickel, or cobalt sulphate, the corresponding 1:1 copper or nickel complex or 1:2 cobalt complex is formed with which it is possible to dye wool or polyamide fibres in fast, bluish green to green shades.

EXAMPLE 4

42.45 Parts of the monoazo dyestuff obtainable by the coupling in alkaline medium of 2,3-dihydroxy-5-bromopyridine with diazotised 4-chloro-2-aminophenol-6-sulphonic acid are dissolved with stirring in 800 parts of water which has a temperature of 80°C. Upon dropping in 10 parts of pyridine the reaction mixture is stirred until the starting dyestuff is no longer detectable. The shade of the solution changes in the process from violet to reddish brown. The new dyestuff of the probable constitution

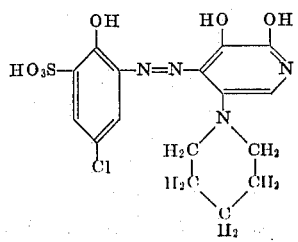

is precipitated by addition of ammonium sulphate, isolated by filtration, and washed with ammonium sulphate solution. The metallising with copper sulphate according to the directions of Example 1 yields the corresponding greenish-blue 1:1 copper complex which dyes wool in fast shades from a week acid bath.

EXAMPLE 5

42.5 Parts of the monoazo dyestuff mentioned in Example 1 obtained from diazotised 8aminoquinoline-5-sulphonic acid and 2,3-dihydroxy-5-bromopyridine, 15 parts of crystallised sodium acetate and 20 parts of 4-aminoacetanilide are stirred with 1,000 parts of water at 90°–95°C until the starting dyestuff is no longer detectable. In the process the initially violet red solution turns yellowish brown. The new dyestuff of the probable formula

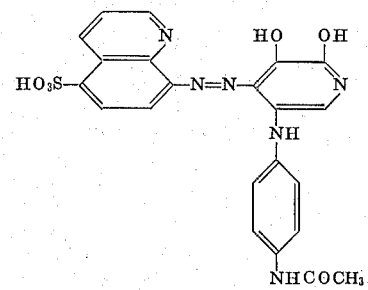

precipitates partially as the reaction solution cools and the precipitation is brought to completion by addition of sodium chloride. The dyestuff paste obtained after filtration and washing with saline solution yields the corresponding greenish blue 1:1 copper or bluish green 1:1 nickel or green 1:2 cobalt complex on metallising according to the directions of Example 1.

The dyestuff paste obtained according to the above directions is stirred with 500 parts by volume of a 10 percent sodium hydroxide solution and the resulting solution is subsequently stirred under reflux until the originally present acetylamino group is completely saponified to the free amino group. The reaction solution is cooled to 5° to 10°C and neutralised by addition of concentrated hydrochloric acid. After stirring in 17 parts of sodium hydrogen carbonate the reaction solution is treated, while stirring vigorously, with the solution of 27.5 parts of $\alpha,\beta$-dibromopropionic chloride in 50 parts by volume of acetone and the whole mixture is stirred at constant temperature until no further amino groups are detectable. The new dyestuff containing an $\alpha,\beta$-dibromopropionylamino group is converted according to the directions of Example 1 into the corresponding 1:2 cobalt complex which dyes wool in fast, bluish green shades.

It is also possible to carry out the cited saponification and reapeated acylation with the corresponding 1:2 cobalt complex of the starting dyestuff which contains acetylamino groups.

EXAMPLE 6

34.5 Parts of the monoazo dyestuff obtained by the coupling in alkaline medium of diazotised 8-aminoquinoline with 2,3-dihydroxy-5-bromopyridine, are stirred with 300 parts by volume of glycol monomethyl ether at 100°C. After dropping in 13 parts of 2-aminoethanol, the reaction mixture is stirred at 100° to 105°C until the reddish violet starting dyestuff is completely converted into the reddish brown new dyestuff of the following constitution

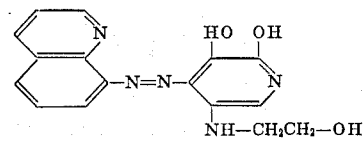

The dyestuff is precipitated by diluting the reaction mixture with water, isolated by filtration and dried in vacuo at 80°C.

40.4 Parts of the new dyestuff are dissolved with stirring in 200 parts by volume of concentrated sulphuric acid at 0° to 5°C. The reaction mixture is stirred for several hours at the same temperature and the poured on 400 parts of ice. The sulphuric acid half ester of the above dyestuff which occurs as precipitate is filtered off and washed with sodium chloride solution. The corresponding metal complexes with which it is possible to dye woollen knitting yarn in greenish blue or bluish green shades respectively are obtained by metallising the dyestuff paste with copper, nickel or cobalt sulphate according to the directions of Example 1.

EXAMPLE 7

42.5 Parts of the azo dyestuff specified in Example 1 are stirred with 800 parts of water having a temperature of 80°C. Upon addition of 30 parts of crystallised sodium acetate and 15 parts of 2-aminobenzoic acid the reaction mixture is heated to the boil with stirring until the starting dyestuff is no longer detectable. The resulting orange brown solution contains the dyestuff of the formula

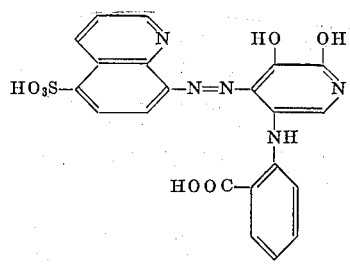

If the metallising of the reaction solution is carried out with copper, nickel, or cobalt sulphate according to the directions of Example 1, there are formed the corresponding metal complexes which can be precipitated by addition of sodium chloride and isolated by filtration. The new dyestuffs are suitable for dyeing wool or polyamide fabrics in fast, greyish blue to bluish green shades.

EXAMPLE 8

38.0 Parts of the monoazo dyestuff mentioned in Example 3 are stirred with 800 parts of water having a temperature of 50°C and 25 parts by volume of a 20 percent soidum carbonate solution. The deep violet red solution is treated with 8.5 parts of 2-mercaptoethanol and the bath is subsequently stirred at 65°–70°C until the starting dyestuff is completely used up. The new dyestuff of the probable constitution

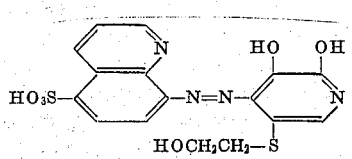

is precipitated from the yellowish brown reaction solution by addition of sodium chloride, isolated by filtration, and washed with dilute saline solution.

The 1:1 nickel complex of the new dyestuff obtainable according to the directions of Example 1 dyes polyamide fibres in pure, greenish blue shades.

EXAMPLE 9

42.5 Parts of the monoazo dyestuff specified in Example 1 are stirred with 800 parts by bolume of water having a temperature of 90°C and 50 parts by volume of a 20 percent sodium carbonate solution. Upon addition of 10 parts of phenol, the reaction mixture is stirred under reflux until the original reddish violet colour of the solution has turned to orange yellow. The resulting new dyestuff of the probable structural formula

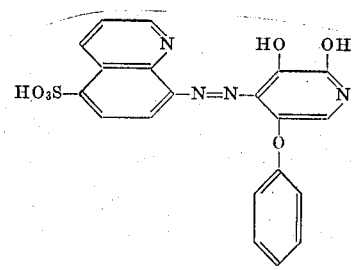

is converted by metallising with copper or nickel sulphate according to directions of Example 1 into the corresponding 1:1 metal complexes which dye polyamide fibres in greyish violet or greyish blue shades respectively.

EXAMPLE 10

31.0 Parts of the monoazo dyestuff obtained by the coupling in alkaline medium of 2,3-dihydroxy-5-bromopyridine with diazotised 2-aminophenol are stirred with 1,000 parts by volume of water having a temperature of 80°C. Upon addition of 15 parts of anhydrous neutral soidum sulphite, the reaction mixture is stirred for 12 hours at 90°C. The new dyestuff of the constitution

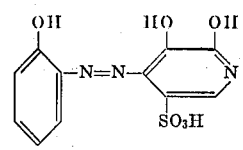

is precipitated from the violet red solution after filtering until clear by addition of potassium chloride and isolated by filtration. The 1:1 copper complex obtainable in the customary manner dyes polyamide fibres in blue, the corresponding 1:1 nickel complex in violet shades. The 1:2 cobalt complex yields bluish grey dyeings on woollen knitting yarn.

EXAMPLE 11

44.0 Parts of the 1:1 chromium complex (obtained in known manner) of the monoazo dyestuff from diazotised 1-amino-2-hydroxynaphthalene-4-sulphonic acid and 2-hydroxy-naphthalene and 41.7 parts of the monoazo dyestuff obtainable according to Example 1 are stirred with 1,000 parts of water having a temperature of 80°C and 50 parts of a 20 percent sodium carbonate solution at 90° to 95°C until both starting dyestuffs can no longer be detected. The resulting deep blue solution contains the unitary mixed complex of the following constitution

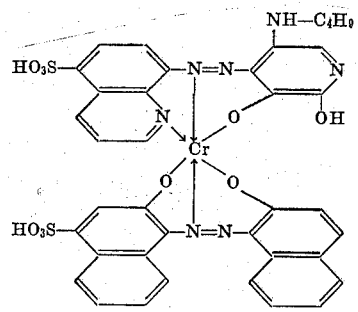

The new dyestuff dyes wool or polyamide fibres from a weak acid both in full reddish blue shades.

Similar copper, nickel and cobalt complex dyestuffs which have the shades indicated in columns IV, V and VI of the following table, are obtained from the diazo and coupling components of columns I and II, the substituting components of column III and the corresponding metal donating compounds.

Directions for dyeing woollen fabric

At a temperature of 50° to 60°C, 100 parts of woollen fabric are put into a dyebath consisting of 3,000 parts of water, 5 parts of 40 percent acetic acid, 10 parts of sodium sulphate, 2 parts of the ethylene oxide addition product whose manufacture is described hereinbelow, and 1 part of the 1:2 cobalt complex mentioned in Example 1. After the bath has been heated to the boil within half an hour dyeing is carried out for a further hour at boiling temperature. After rinsing and drying the fabric there results a uniform greenish blue dyeing.

The ethylene oxide addition product may be manufactuee as follows:

100 Parts of industrial oleylamine are treated with 1 part of finely divided sodium and the mixture is heated to 140°C, when ethylene oxide is passed in at 135° to 140° C. As soon as the ethylene oxide has been rapidly taken up the reaction temperature is lowered to 120°–125°C and the passing in of ethylene oxide is continued until 113 parts of it have been taken up. The thus obtainable reaction product dissolved to a practically clear solution in water.

Directions for dyeing polyamide

| No. | I diazo component | II coupling component | III substituting component | IV 1:1-copper complex | V 1:1 nickel complex | VI 1:2-cobalt complex |
|---|---|---|---|---|---|---|
| 1 | 8-aminoquinoline | 2,3-dihydroxy-5-chloropyridine | γ-methoxy-n-propylamine | blue | greenish blue | bluish green |
| 2 | do. | 2,3-dihydroxy-5-bromopyridine | γ-isopropoxy-n-propylamine | blue | greenish blue | green |
| 3 | do. | do. | 2-mercaptobenzoic acid | greenish blue | bluish green | green |
| 4 | do. | do. | N,N-diethylethylenediamine | blue | greenish blue | bluish green |
| 5 | 8-aminoquinoline-5-sulphonic acid | 2,3-dihydroxy-5-bromopyridine | thiophenol | greenish blue | bluish green | green |
| 6 | do. | do. | 2-mercaptobenzothiazole | greenish blue | greenish blue | bluish green |
| 7 | do. | do. | potassium cyanide | blue | greenish blue | bluish green |
| 8 | do. | do. | 2-aminonaphthalene-6-sulphonic acid | greyish blue | greenish blue | bluish green |

| No. | I diazo component | II coupling component | III substituting component | IV 1:1-copper complex | V 1:1 nickel complex | VI 1:1-cobalt complex |
|---|---|---|---|---|---|---|
| 9 | 3-amino-7-chloroindazole | 2,3-dihydroxy-5-bromopyridine | cyclohexylamine | bluish violet | violet | greyish blue |
| 10 | 2-amino-4-phenyl-1,3,5-thiadiazole | do. | 2-mercaptonaphthalene | greenish blue | bluish green | green |

At a temperature of 50° to 60°C, 100 parts of nylon 6,6 fabric are put into a dyebath consisting of 3,000 parts of water, 5 parts of 40 percent acetic acid, 10 parts of sodium sulphate and 1 part of the copper complex mentioned in Example 1. After the bath has been heated to the boil within half an hour dyeing is carried out for a further hour at boiling temperature. After rinsing and drying the fabric there results a uniform greyish blue dyeing.

Directions for dyeing woollen knitting fabric

At a temperature of 50°C 100 parts of previously wetted woollen knitting fabric are put into a dyebath consisting of 3,000 parts of water, 5 parts of 40 percent acetic acid, 10 parts of sodium sulphate, 2 parts of the ethylene addition product described in the previous Example for dyeing woollen fabric and 1 part of the 1:1 copper complex described in Example 2. In the course of half an hour the bath is heated to the boil and this temperature is maintained for a further hour. The fabric is then rinsed and dried. A uniform, greenish blue dyeing having good fastness properties is obtained. Uniform, bluish green dyeing with good fastness properties result likewise with the corresponding 1:2 cobalt complex.

By extracting the dyed wool fibres with a mixture of pyridine and water in the ratio 1:1 only a small amount of dyestuff becomes detached: a fact which points to a convalent bond of the dyestuff to the wool fibres accompanied by replacement of the sulphonic acid group introduced according to Example 2 by suitable groups of the wool fibres.

Similar results are obtained if the 1:2 cobalt complex mentioned in Example 3 is used as dyestuff. The obtainable bluish green dyeings are distinguished likewise by good fastness to wet processings and resistance to extraction by pyridine/water.

Dyeing of cotton

2 Parts of the 1:1 copper complex described in Example 1 and 2 parts of anhydrous sodium carbonate are dissolved at room temperature in a mixture of 25 parts of urea and 75 parts of water. A piece of cotton fabric is impregnated with the resulting solution, squeezed out to a 75 percent retention of weight and dried at 90° to 100°C. The impregnated fabric is then subjected for 60 seconds to the action of dry heat (approx. 140°C). After rinsing and soaping, a bloomy reddish dyeing blue dyeing is obtained which is resistant to extraction with a mixture of dimethyl formamide and water in the ration 1:1.

A strongly greenish blue dyeing of similar fastness behaviour is obtaind with the corresponding 1:2 cobalt complex under the same conditions.

If the 1:2 cobalt complex mentioned in Example 3 is used as dyestuff, a greenish blue dyeing distinguished by excellent fastness to wet processings and stability to extraction likewise results.

In the case of the above mentioned dyeings a reaction of the dyestuff with the fibre is to be assumed, i.e. the the substituents introduced according to Examples 2 and 3 are replaced by reactive groups of the cellulose fibres.

It is claimed:

1. The heavy metal complex of an azo compound of the formula

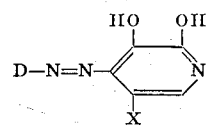

where

D is the residue of a heterocyclic diazo component and is selected from pyridyl; benthiazolyl that is unsubstituted or substituted by chloro, nitro or methoxy; indazolyl that is unsubstituted or substituted by chloro, methoxy or nitro; triazolyl; carboxytriazolyl; 4-phenyl-5-methylpyrazolyl; 1-phenyl-2,3-dimethylpyrazolyl-5-one; benztriazolyl; benzimidazolyl; thiazolyl; methylthiazolyl; thiadiazolyl that is unsubstituted or substituted by phenyl, pyridyl, acetylamino, phenylsulphonyl, chloro, carbomethoxy, methylthio, ethylthio, phenylthio, cyclohexylthio, methylsulphonyl or methyl; quinolyl that is unsubstituted or substituted by sulfo, chloro, bromo, acetylamino, methyl, sulfophenylazo, or sulfophenylazo containing a fibre-reactive acylamino group where acyl is selected from chloroacetyl, bromoacetyl, $\beta$-chloropropionyl, $\beta$-bromopropionyl, $\alpha,\beta$-dichloropropionyl, $\alpha,\beta$-dibromopropionyl, chloromaleyl, acrylyl, $\beta$-chloroacrylyl, $\beta$-bromoacrylyl, $\alpha$-chloroacrylyl, $\alpha$-bromoacrylyl, $\alpha,\beta$-dichloroacrylyl, $\alpha,\beta$-dibromoacrylyl, trichloroacrylyl, chlorocrotonyl and propiolyl; or benzisothiazolyl that is unsubstituted or substituted by methyl, ethyl, methoxy, chloro, bromo, cyano, nitro, N-methylsulphonamido, N,N-dimethylsulfonamido or methylsulfonyl; or D is phenyl or naphthyl that contains an OH, $NH_2$ or COOH group in the position ortho-to the azo bond, said phenyl or naphthyl being further unsubstituted or substituted by chloro, bromo, nitro, cyano, lower alkyl, lower alkoxy, lower alkylsulphonyl, sulfonic acid, carboxylic acid, sulphonamide, N-lower alkyl-sulphonamide, N-lower hydroxyalkyl-sulphonamide, N,N-diethylsulphonamide, N,N-di($\beta$-hydroxyethyl)-sulphonamide, phenylazo, naphthylazo, formylamino, acetylamino, benzoylamino, benzenesulphonamide, p-toluenesulphonylamino, methanesulphonylamino, carboxymethoxyamino, carboethoxyamino, dimethylamino-sulphonylamino or isopropoxyamino, and X is hydroxy, alkoxy of 1 to 4 carbon atoms, phenoxy, naphthoxy, benzyloxy, amino, alkylamino of 1 to 4 carbon atoms, $\beta$-hydroxyethylamino, $\gamma$-methoxy-n-propylamino, isopropoxy-n-propylamino, N,N-diethylethylenediamine, cyclohexylamino, piperidyl, morpholyl, phenylamino, carboxyphenylamino, sulfonaphthylamino, mercapto, methylthio, $\beta$-hydroxyethylthio, phenylthio, carboxyphenylthio, naphthylthio, thiazolylthio, methylsulphonyl, phenylsulphonyl, methylphenylsulphonyl, sulfo or fibre-reactive acylamino where acyl is selected from the group consisting of chloroacetyl, bromoacetyl, $\beta$-chloropropionyl, $\beta$-bromopropionyl, $\alpha,\beta$-dichloropropionyl, $\alpha,\beta$-dibromopropionyl, chloromaleyl, acrylyl,$\beta$-chloroacrylyl, $\beta$-bromoacrylyl, $\alpha$-chloroacrylyl, $\alpha$-bromoacrylyl, $\alpha,\beta$-dichloroacrylyl, $\alpha,\beta$-dibromoacrylyl, trichloroacrylyl, chlorocrotonyl and propiolyl.

2. The complex of claim 1 which comprises the 1:1 or 1:2 complex of iron, manganese, nickel, copper, cobalt or chromium.

3. The complex of claim 2 in which D is the residue of a heterocyclic diazo component, as defined.

4. The complex of claim 3 in which X is hydroxy, alkoxy of 1 to 4 carbon atoms, phenoxy, naphthoxy, mercapto, amino, methylsulphonyl, phenylsulphonyl, methyl-phenylsulphonyl or sulpho.

5. The complex of claim 4 in which D is unsubstituted or substituted quinolyl.

6. The complex of claim 2 in which the heavy metal is cobalt, nickel or copper.

7. The heavy metal complex of an azo compound of the formula

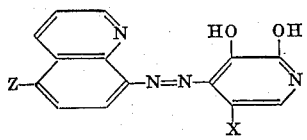

in which
Z is sulfo, chloro, bromo, acetylamino, methyl, sulphophenylazo, or sulfophenylazo containing a fibre-reactive acylamino group where acyl is selected from the group consisting of chloroacetyl, bromoacetyl, β-chloropropionyl, β-bromopropionyl, α,β-dichloropropionyl, α,β-dibromopropionyl, chloromaleyl, acrylyl, β-chloroacrylyl, β-bromoacrylyl, α-chloroacrylyl, α-bromoacrylyl, α,β-dichloroacrylyl, α,β-dibromoacrylyl, trichloracrylyl, chlorocrotonyl and propiolyl, and
X is hydroxy, alkoxy of 1 to 4 carbon atoms, phenoxy, naphthoxy, benzyloxy, amino, alkylamino of 1 to 4 carbon atoms, β-hydroxyethylamino, γ-methoxy-n-propylamino, isopropoxy-n-propylamino, N,N-diethylethylenediamine, cyclohexylamino, piperidyl, morpholyl, phenylamino, carboxyphenylamino, sulfonaphthylamino, mercapto, methylthio, β-hydroxyethylthio, phenylthio, carboxyphenylthio, naphthylthio, thiazolylthio, methylsulphonyl, phenylsulphonyl, methylphenylsulphonyl, sulfo or fibre-reactive acylamino where acyl is selected from the group consisting of chloroacetyl, bromoacetyl, β-chloropropionyl, β-bromopropionyl, α,β-dichloropropionyl, α,β-dibromopropionyl, chloromaleyl, acrylyl, β-chloroacrylyl, β-bromoacrylyl, α-chloroacrylyl, α-bromoacrylyl, α,β-dichloroacrylyl, α,β-dibromoacrylyl, trichloroacrylyl, chlorocrotonyl and propiolyl.

8. A heavy metal complex according to claim 7 in which the azo compound has the formula

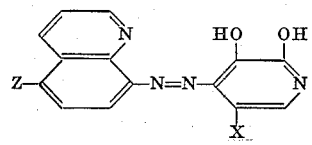

in which Z is chloro, bromo, sulfo, acetylamino, phenylazo, sulphophenylazo, (sulpho, α,β-dibromopropionylamino) phenylazo or (sulpho, α-bromoacryl) phenylazo.

9. A heavy metal complex according to claim 8 in which the heavy metal is copper or nickel.

* * * * *